Aug. 30, 1932.  F. WINDECKER  1,874,402
COVER LOCKING AND DRIVE CONTROLLING MEANS
FOR MIXING AND ANALOGOUS MACHINES
Filed April 7, 1930  2 Sheets-Sheet 1
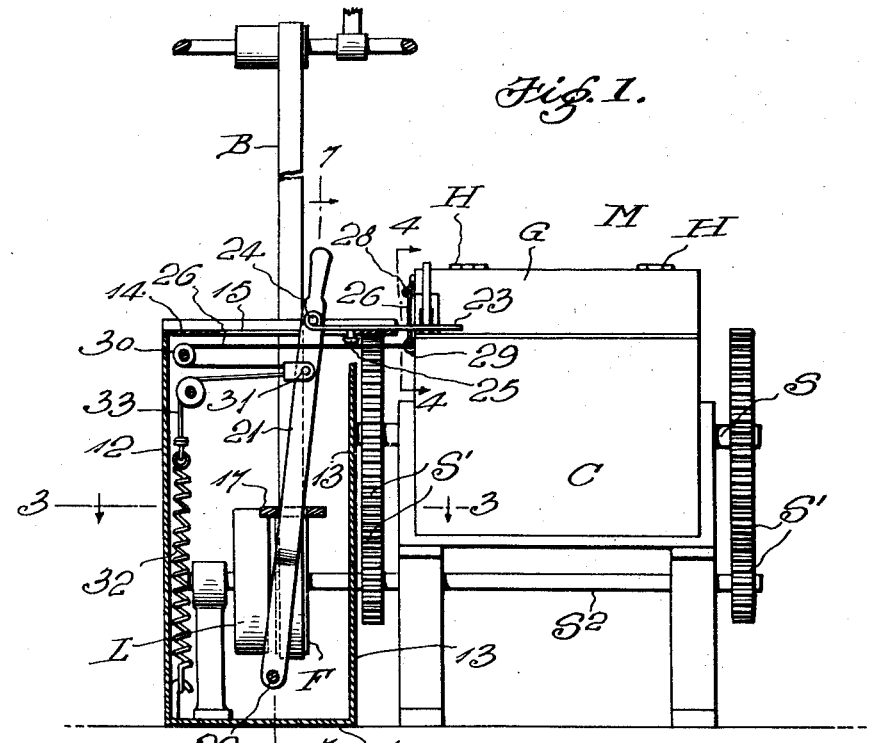
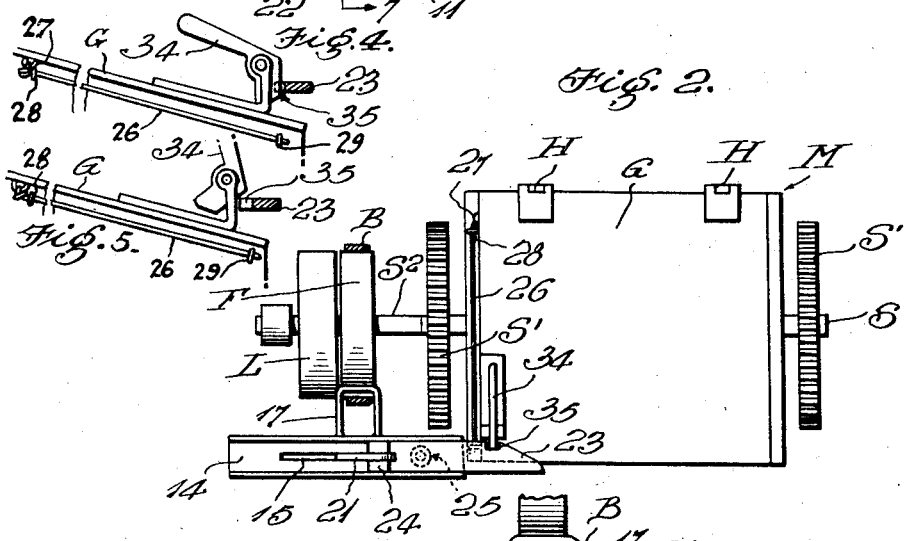
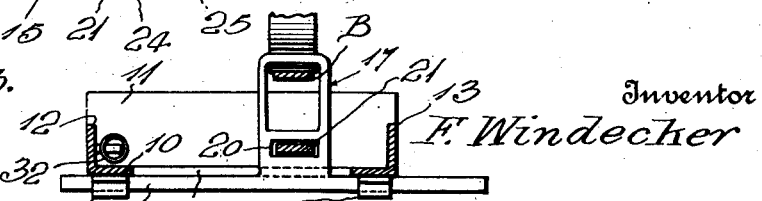

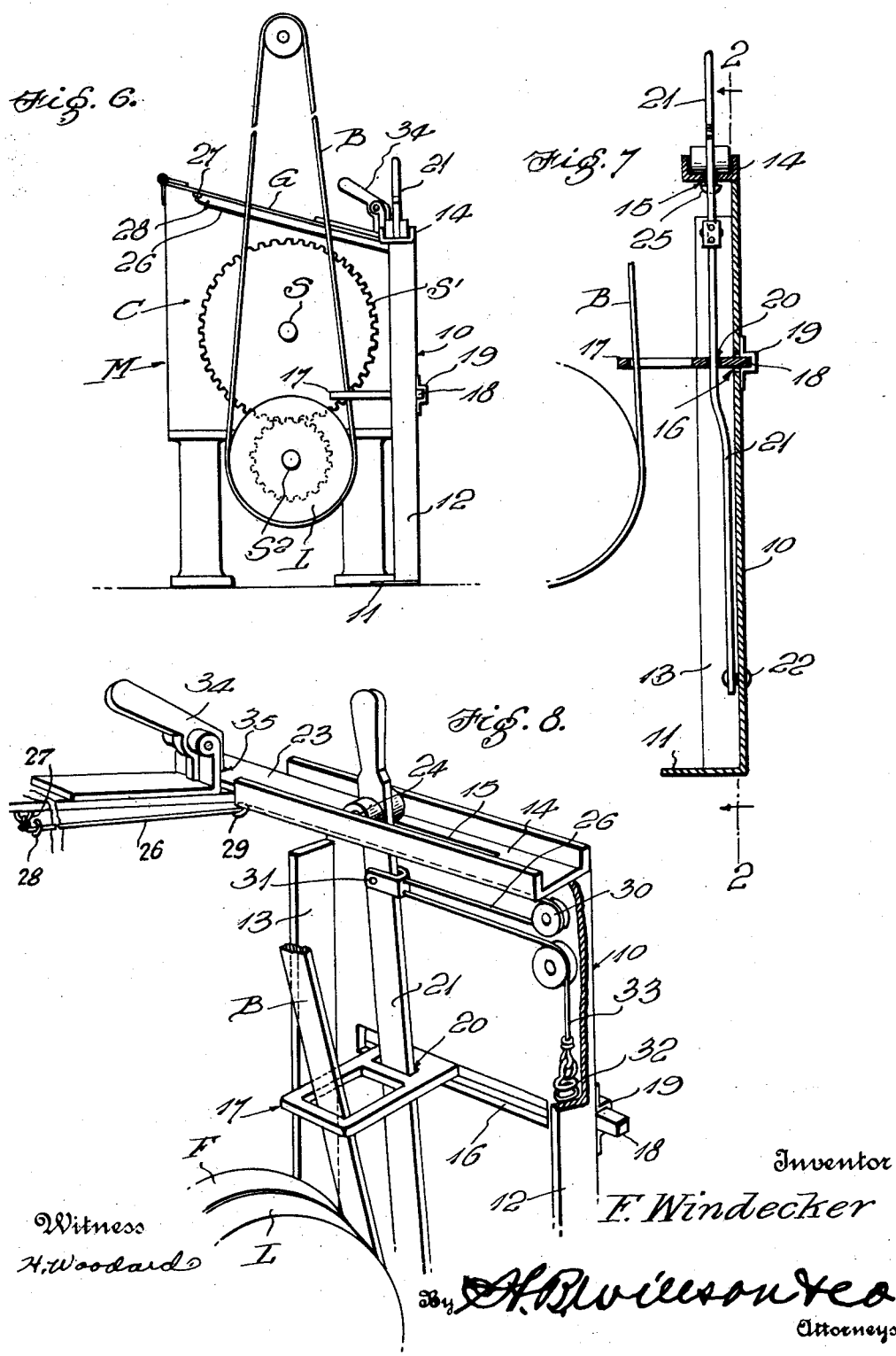

Patented Aug. 30, 1932

1,874,402

UNITED STATES PATENT OFFICE

FRIEDRICH WINDECKER, OF FORT LEE, NEW JERSEY

COVER-LOCKING AND DRIVE-CONTROLLING MEANS FOR MIXING AND ANALOGOUS MACHINES

Application filed April 7, 1930. Serial No. 442,330.

Bakers' mixing machines and machines of analogous nature, are commonly provided with internal agitators, access to which is normally prevented by a closed cover or guard for the mixing chamber or the like. Nevertheless, by raising the cover or guard, it is possible to gain access to the interior of the machine while the agitators or the like are being driven, with consequent danger of injury. It is the principal object of my invention to provide a new and improved means whereby the cover or guard is securely locked in closed position, as long as the driving means for the agitators or the like, is in operation, provision being made whereby a control lever for the driving means, applies the cover or guard locking means when moved in one direction but releases it when moved in the other direction.

A further object is to provide novel means whereby the above mentioned lever cannot be moved to machine-driving position while the cover or guard stands open, provision being made whereby an attempt to move said lever to said position, will immediately close the cover or guard.

A further object is to provide rather simple and inexpensive, yet efficient and reliable construction which may readily be adapted to the machine.

Fig. 1 is a front elevation partly in section showing the application of the invention to a mixing machine.

Fig. 2 is a top plan view partly in horizontal section.

Fig. 3 is a horizontal sectional view on line 3—3 of Fig. 1.

Fig. 4 is a detail vertical sectional view taken substantially on line 4—4 of Fig. 1.

Fig. 5 is a similar view but showing a different position of the cover-carried latch.

Fig. 6 is an end elevation of the parts shown in Fig. 1.

Fig. 7 is an enlarged vertical sectional view substantially on line 7—7 of Fig. 1, and by means of the broken line 2—2, this view illustrates the plane on which the sectional portion of Fig. 1, is cut.

Fig. 8 is a fragmentary perspective view partly broken away and in section.

For illustrative purposes, the invention has been shown in connection with a mixing machine M embodying a casing C whose interior constitutes a mixing chamber, said casing being provided with a normally closed, upwardly swinging cover or guard G. Within the casing C, is an agitator whose shaft is shown at S, said shaft being connected by gearing $S^1$ with a lower shaft $S^2$, the latter having a fixed pulley F and a loose pulley L, either of which may be engaged by a belt B. Provision is made whereby the cover or guard G is securely locked in closed position when the belt B is shifted onto the fixed pulley F, to drive the machine, and whereby said cover or guard is released when the belt is shifted onto the loose pulley L to stop the machine-driving operation. Provision is also made for closing the cover or guard G in case an attempt should be made to start the machine with said cover or guard standing open. A preferred manner of obtaining these results, has been shown and will be described below.

The numeral 10 denotes a vertically elongated metal plate provided with a base flange 11 for anchorage to the floor upon which the machine M is supported, the vertical edges of said plate being provided with reinforcing flanges 12 and 13 respectively, and the upper end of said plate being equipped with a rigidly attached, horizontal guide member 14 formed from a length of channel metal, the bottom of this guide member being provided with a longitudinal slot 15. The plate 10 is disposed in front of the pulleys L and F and the guide member 14 is slightly above the normal position of the guard or cover G, said guide member extending parallel with the hinges H of said guard or cover, in the present disclosure.

Between its upper and lower ends, the plate 10 is formed with a horizontal slot 16 through which a belt-shifting yoke 17 passes, said yoke being engaged with the belt B. Preferably, the front end of the yoke 17 is integral with or otherwise secured to a horizontal bar 18 disposed at the front side of the plate 10 and slidably mounted in appropriate guides 19. In advance of its belt-engaging portion, the yoke 17 is provided with a slot 20 through which a belt-shifting lever 21 passes, said lever being vertically disposed behind the plate 10, having its lower end fulcrumed to the latter as indicated at 22, and having its upper portion passed slidably through the slot 15 of the guide member 14. Slidable in the channel of this guide member, is a locking bar 23 for the cover or guard G, said bar 23 being pivoted at 24 to the lever 21 and being adapted to be projected by this lever to a normal position at which it overlies the cover or guard G, as shown for instance in Figs. 1, 2 and 8. Bar 23 is held against upward swinging from the channel of the guide member 14, by a headed stud 25 which is slidably engaged with the slot 15, as shown most clearly in Figs. 1 and 7. Hence, as long as the bar 23 overlies the cover or guard G, the latter cannot be opened, and it will be observed that whenever the lever 21 is shifted to effect shifting of the belt B onto the fixed pulley F to drive the machine, said bar 23 is projected to its operative position. Hence, the cover or guard G cannot be opened until lever 21 is shifted to machine-stopping position, the belt B being then engaged with the loose pulley L.

A cover or guard-closing cable 26 has one of its ends secured at 27 to the cover or guard G, said cable passing through guides 28 and 29 from the rear portion of said cover to a point near the inner edge of the plate 10. At this point, the cable turns laterally behind plate 10, passes around a sheave 30 mounted upon said plate and at 31, is secured to the lever 21. The cover is usually closed by hand, but by the arrangement shown, should an attempt be made to shift the lever 21 to machine-operating position, with the cover or guard G standing open, the cable 26 will be pulled upon by said lever and will consequently swing said cover or guard downwardly to closed position before the machine can start. The travel of the bar 23 from its released position (lever 21 to the left in Fig. 1) to its cover-locking position, is sufficiently long to allow the cover to close when jerked by the cable 26, before said bar 23 is projected sufficiently to reach the path of the closing cover. Hence, the cover will close and the bar 23 slide over it, locking it closed.

Preferably, a tension spring 32 is mounted behind the plate 10 and connected by a cable 33 with the lever 21, for the purpose of moving the latter to machine-stopping position, and to normally hold said lever against movement under the influence of said spring, a pivoted latch 34 is provided on the cover or guard G, said latch being normally engaged with a notch 34 in the bar 23, as seen in Figs. 2, 4 and 8. When it is desired to stop the machine and open the cover or guard G, it is simply necessary to release the latch 34, whereupon the spring 32 effects movement of the lever 21 to machine-stopping position, at the same time withdrawing the cover or guard-locking bar 23 to inoperative position, allowing said cover or guard to be raised.

By providing the novel subject matter herein disclosed, or a substantial equivalent thereof, an unfailing element of safety may be added to mixing and analogous machines. The details disclosed may be followed if desired, but attention is again invited to the fact that within the scope of the invention as claimed, variations may be made.

I claim:—

1. In combination with a machine having a guard movable to open and closed positions, and driving means for said machine having a control lever; connecting means between said lever and said guard for moving the latter to closed position when said lever is moved toward machine-driving position, and means independent of said connecting means and connected with said lever for locking said guard in closed position when said lever reaches machine-driving position, said locking means being releasable by movement of said lever to machine-stopping position.

2. In combination with a machine having a normally lowered upwardly movable cover, and driving means for said machine having a belt, said belt being shiftable toward an edge of said cover to effect machine driving and shiftable in the other direction to effect machine stopping; a fixed vertical support near said belt, a horizontally movable belt shifter mounted on said support, a vertical lever fulcrumed to said support and connected with said belt shifter for operating the same, a horizontally shiftable locking member for said cover connected with and actuated by said lever, and means mounting said locking member on said support.

3. In a mechanism of the class described, a vertical support adapted for rigid mounting, a vertical machine-controlling lever fulcrumed at its lower end to said support and having its upper end extended above said support, a horizontal channel-shaped guide member secured to said upper end of the support and having a slot in its bottom through which said lever passes slidably, a horizontal guard-locking member slidably engaged with said guide member and pivoted to said lever, and means on said guard-locking member slidably engaged with said slot for holding said guard-locking member against upward swinging from the channel of said guide member.

4. In a mechanism of the class described, a vertical support adapted for rigid mounting, said support having an upper horizontal guideway and a lower horizontal guideway, a guard-locking member slidably engaged with said upper guideway, a belt shifter slidably engaged with said lower guideway, and a vertical lever fulcrumed to said support and connected with said guard-member and said belt shifter.

5. In combination with a machine having a normally closed guard movable to an open position, and driving means for said machine embodying a control lever movable to machine-driving and machine-stopping positions; a locking member connected with said lever and projectable by the latter to a position at which it locks said guard in closed position while the machine is in operation, spring means exerting a constant force tending to move said lever to machine stopping position, and latch means co-operable with said locking member for holding the latter and said lever normally against movement under the influence of said spring means, whereby upon release of said latch means, said lever and said locking member will be moved by said spring means, thereby stopping the machine and releasing the guard.

In testimony whereof I affix my signature.

FRIEDRICH WINDECKER.